United States Patent
Ng-Thow-Hing et al.

(10) Patent No.: US 8,265,425 B2
(45) Date of Patent: Sep. 11, 2012

(54) RECTANGULAR TABLE DETECTION USING HYBRID RGB AND DEPTH CAMERA SENSORS

(75) Inventors: Victor Ng-Thow-Hing, Sunnyvale, CA (US); Jingyu Yan, Redmond, WA (US)

(73) Assignee: Honda Motor Co., Ltd., Tokyo (JP)

( * ) Notice: Subject to any disclaimer, the term of this patent is extended or adjusted under 35 U.S.C. 154(b) by 1149 days.

(21) Appl. No.: 12/124,016

(22) Filed: May 20, 2008

(65) Prior Publication Data

US 2009/0290758 A1    Nov. 26, 2009

(51) Int. Cl.
    *G06K 9/36*    (2006.01)
(52) U.S. Cl. .................... 382/291; 382/199; 382/281
(58) Field of Classification Search .................. 382/108, 382/153, 154, 162, 199, 260, 281, 286, 291; 345/419; 700/245
See application file for complete search history.

(56) References Cited

U.S. PATENT DOCUMENTS

| | | | |
|---|---|---|---|
| 5,243,665 A | 9/1993 | Maney et al. | |
| 5,867,592 A | 2/1999 | Sasada et al. | |
| 6,095,989 A | 8/2000 | Hay et al. | |
| 6,473,079 B1 | 10/2002 | Kacyra et al. | |
| 6,611,617 B1 * | 8/2003 | Crampton | 382/154 |
| 6,813,395 B1 | 11/2004 | Kinjo | |
| 7,068,817 B2 | 6/2006 | Bourg, Jr. et al. | |
| 7,466,841 B2 | 12/2008 | Bahlmann et al. | |
| 7,653,216 B2 * | 1/2010 | Kanade et al. | 382/106 |
| 7,747,045 B2 | 6/2010 | Chinen et al. | |
| 7,865,267 B2 * | 1/2011 | Sabe et al. | 700/245 |
| 7,948,493 B2 | 5/2011 | Klefenz et al. | |
| 2004/0013295 A1 | 1/2004 | Sabe et al. | |
| 2005/0216274 A1 | 9/2005 | Kim | |
| 2007/0127816 A1 | 6/2007 | Balslev et al. | |

FOREIGN PATENT DOCUMENTS

EP    1783683 A1    5/2007

OTHER PUBLICATIONS

Ballard, D.H., "Generalizing the Hough Transform to Detect Arbitrary Shapes," Pattern Recognition, 1981, p. 111-122, vol. 13, No. 2.
Erdtmann, M., "Automatic calibration process of a machine vision system for workpiece pose measurement within a CNC machine," Sep. 2006, Can be retrieved from the internet: <URL:http://www.impa.br/opencms/pt/eventos/downloads/jornadas_2006/trabalhos/jornadas_mathias_erdtmann.pdf>.

(Continued)

*Primary Examiner* — Phuoc Tran
(74) *Attorney, Agent, or Firm* — Fenwick & West LLP; Mark E. Duell

(57) ABSTRACT

Objects having a flat surface such as a table are detected by processing a depth image and a color image. A mask indicating an area likely to include an object having the flat surface is generated by processing a depth image including the depth information. A color image corresponding to the depth image is then cropped using the mask to detect a portion of the color image that likely include the object having the flat surface. Geometric features of the cropped color image such as lines are then detected to determine the location and orientation of the object having the flat surface. A subset of the detected geometric features is selected as outlines of the flat surface.

20 Claims, 9 Drawing Sheets

OTHER PUBLICATIONS

Hartley, R., et al., "Multiple view geometry in computer vision," First Edition, 2003, p. 205-213, Cambridge University Press.
Gheissari, N., "Model Selection for Visual Data Segmentation," 2004, Can be retrieved from the internet: <URL:http://www.ses.swin.edu.au/~ali/NiloofarThesis.pdf>.
PCT International Search Report and Written Opinion, PCT/US2008/068242, Oct. 7, 2008.
PCT International Search Report and Written Opinion, PCT/US2009/040531, Jun. 10, 2009, 9 Pages.

* cited by examiner

RECTANGULAR TABLE DETECTION USING HYBRID RGB AND DEPTH CAMERA SENSORS

FIELD OF THE INVENTION

The present invention is related to a method and system for localizing a flat surface from image data, more specifically to a method and system for localizing a flat surface using the combination of color image data and depth image data.

BACKGROUND OF THE INVENTION

In many circumstances, a robot must acquire information about objects and its location within the surroundings. After the robot is placed in a new environment or the environment changes, the robot must detect objects and locate the objects using one or more sensors. Based on sensor inputs, the robot determines spatial relationship between the objects in the environment, and performs various tasks. In some robots, the robots generate occupancy maps that store coordinates of various objects in the environment. The robots then use information in the occupancy maps in conjunction with the sensor inputs to perform various operations on objects in the environment.

Many robotic manipulations such as grabbing or pushing involve actions on objects that are placed on a flat surface. Detecting and localizing objects having flat surfaces are important in many robotic applications because objects having flat surfaces (e.g., table) often serve as a supporting structure or foundation for other target objects for robotic manipulations. Therefore, the robot needs to recognize and determine the spatial relationship between the objects having the flat surface and the target object placed on the flat surface to perform certain tasks on the target object. For example, in order to grab a target object (e.g., cup) on an object having a flat surface (e.g., table), the robot must first determine the location and orientation of the object having the flats surface (e.g., table) so that the robot may move to an area where the target object (e.g., cup) can be reached.

One way of detecting an object having a flat surface is to use a camera for capturing color images of a scene. The image capturing device may generate grayscale or RGB color images. Image processing may then be performed on the captured grayscale or color images to determine the location and orientation of objects having flat surfaces. A disadvantage of using grayscale images or color images is that the accuracy of the determined location and orientation drops significantly in non-ideal cases where part of the flat surface is occluded, the edges of the flat surface are occluded, objects are cluttered on the flat surface or other objects are present in the image having features similar to the object having the flat surface.

Another way of detecting an object having a flat surface is using depth images indicating distance from a sensor to the object. A time-of-flight depth sensor is often used for generating the depth images. The time-of-flight depth sensor sends out a signal to the object and measures a property of the returned signal from the object to determine the distance to the object. The depth images obtained by measuring such returned signal are often very noisy and inaccurate. Consequently, the three-dimensional coordinates of objects determined from the depth are often unreliable and inaccurate.

SUMMARY OF THE INVENTION

Embodiments of the present invention provide a method, a system and a computer program product for localizing an object having a flat surface. A depth image in conjunction with a color image is used to localize the object having the flat surface. The depth image of a scene is processed to determine a candidate area where the flat surface of the object is likely to be present. A portion of the color image corresponding to the candidate area is processed to detect and select geometric features (e.g., lines) that likely outline the flat surface of the object.

In one embodiment, the candidate area is determined from the depth image by computing normal vectors from the pixels of the depth image. The normal vectors are vectors perpendicular to a surface of an object in the depth image. A flat surface is likely to be present in an area of the depth image where the normal vectors are generally in the same direction. The area having the normal vectors in the same direction is then expanded to generate a mask representing the candidate area. The color image may be cropped using the mask to create an image representing a region of interest for further processing.

In one embodiment, the geometric features are detected by detecting edges in the cropped color image and then performing transform for detecting geometric features. The Hough transform may be used to detect the geometric features in the color image. After the geometric features are detected, the lengths of the detected geometric features are adjusted according to depth information in the depth image to determine physical lengths of the geometric features.

In one embodiment, the geometric features outlining the flat surface is determined by ranking the geometric features by the physical lengths. Based on the rank of the physical lengths, a subset of the detected geometric features is selected as outlining a candidate flat surface. The candidate flat surface is determined as a final flat surface if predetermined criteria are met.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF THE INVENTION

Figure 1:
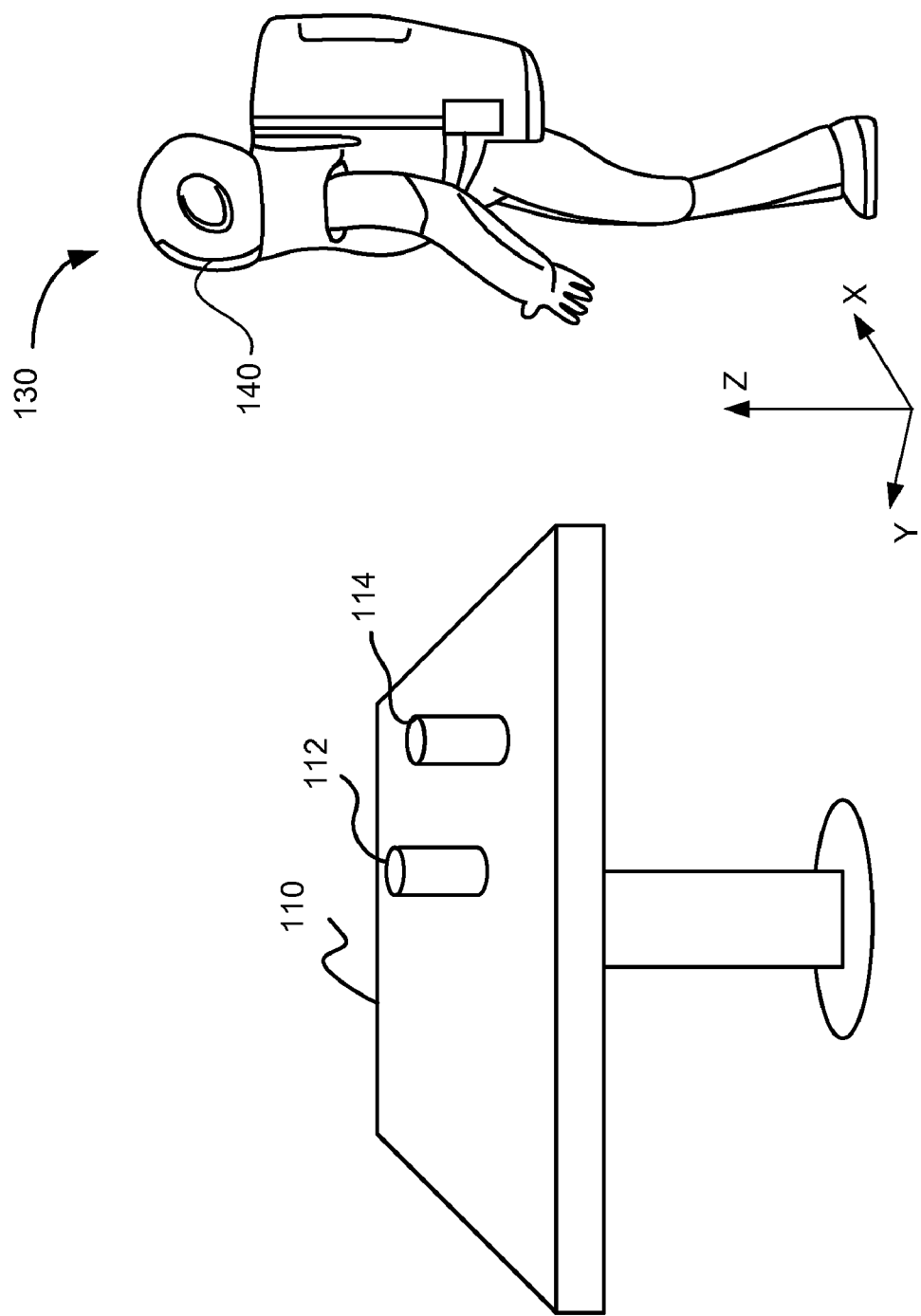
FIG. 1 is a diagram illustrating a robot in an environment including a rectangular table having a flat top surface, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMS, magnetic-optical disks, read-only memories (ROMs), random access memories (RAMs), EPROMS, EEPROMS, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention provided a method, a device and a computer program product for detecting a flat surface in objects such as a table. A mask indicating a region likely to include an object having the flat surface is generated by processing a depth image including the depth information. A color image corresponding to the depth image is then cropped using the mask to outline a portion of the color image likely to include the object having the flat surface. Geometric features of the cropped color image are then detected to determine the location and orientation of the object having the flat surface. A subset of the geometric features is selected as the outlines of the flat surface based on predetermined criteria. By using both the depth image and the color image, the flat surface can be determined more accurately and robustly.

A flat surface refers to any surface that may be substantially flat. The flat surface may be covered with one or more objects that occlude the flat surface. The flat surface may be substantially flat in various directions. For example, the surface may be flat horizontally (e.g., a top surface of a table), vertically (e.g., a blackboard or whiteboard) or in other directions (e.g., slanted surface).

A depth image includes pixels that represent distance from a reference point (e.g., a depth sensor) to an object or a portion of the object corresponding to the pixel. The distance from the reference point to the object or the portion of the object is also referred to as depth information herein. The depth image may be generated by various devices including a time-of-flight depth sensor, stereoscopic cameras and structured light sensors.

A color image includes pixels representing two-dimensional shapes of objects. The color image includes both grayscale images and images in color space. Any color space including RGB, YCbCr, and HSV (hue, saturation, and value) may be used in the color image. The color image, however, does not include any depth information. The color image may be in a compressed format or a non-compressed format.

Localizing of an object refers to determining the location and orientation of the object in two-dimensional space or three-dimensional space. Localization information likewise refers to information indicating the location and orientation of the object in the two-dimensional space or the three-dimensional space. By using the localization information, spatial relationship between two or more objects can be determined.

Overview of Interaction Between Robot and Environment

FIG. 1 illustrates a robot 130 interacting with a rectangular table 110, according to one embodiment of the present invention. The robot 130 of FIG. 1 is a humanoid robot that is capable of performing various operations akin to human motions. One example of such a robot is ASIMO advanced humanoid robot of Honda Motor Co., Ltd., Tokyo, Japan. The robot 130 includes sensors 140 generating a stream of image data, as described below in detail with reference to FIG. 2. The sensors 140 includes, among others, stereoscopic cameras and a time-of-flight depth sensor. Although the following embodiments are described below with reference to a humanoid robot 130, the present invention is not limited to humanoid robots and may be used in other types of robots.

In one embodiment, the robot 130 determines the location of the top surface of the table 110 by processing images captured by the sensors 140. The robot 130 also detects and localizes objects 112, 114 for robotic operations (e.g., grabbing or pushing). In one embodiment, the location of the table 110 and other objects 112, 114 on the table 110 are expressed in terms of two-dimensional coordinates or three-dimensional coordinates and stored in the robot 130, as described below in detail with reference to FIG. 2.

In one embodiment, the robot 130 also tracks and updates the movements of objects 112, 114 within the two-dimensional or three-dimensional coordinate system. The movement of the objects 112, 114 may be caused by operations performed by the robot 130 (e.g., grabbing or pushing) or other reasons (e.g., moving by a human). In both cases, the movements of the objects 112, 114 may be sensed and tracked by monitoring the images generated by the sensors 140.

Figure 2:
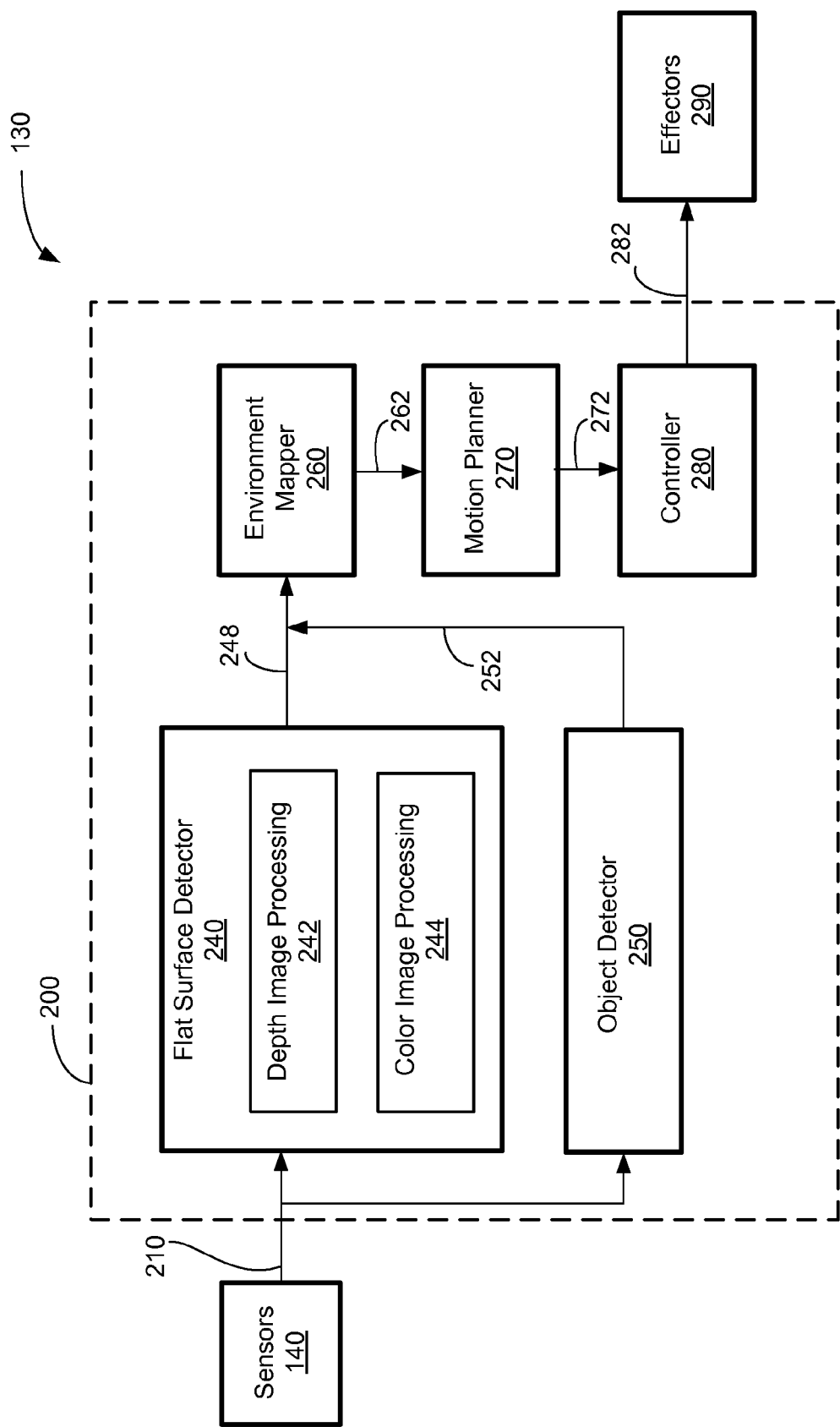
FIG. 2 is a block diagram of a robot, according to one embodiment of the present invention.

Architecture of Processing Module Device for Detecting Objects with Flat Surfaces FIG. 2 is a block diagram of the robot 130, according to one embodiment of the present invention. As illustrated in FIG. 2, the robot 130 includes three major components: sensors 140, a processing module 200, and effectors 290. The sensors 140 provide information about surroundings to the robot 130. The processing module 200 receives the information from the sensors 140, detects objects and conditions surrounding the robot 130, and sends control signals 282 to effectors 290 or other processing units (not shown). Other components of the robot 130 not essential to the present invention are omitted herein for the sake of brevity.

The sensors 140 includes, among others, a depth sensor and an image sensor. The depth sensor and the image sensor are aligned and arranged so that both sensors cover a substantially identical scene. The depth sensor generates depth images having pixels indicating the distance from the depth sensor to an object or a portion of the object. The image sensor captures two-dimensional shapes of the objects in a scene. It is preferable but not necessary that the image sensor and the depth sensor cover the same scene and objects. The stream of image data 210 from the sensors 140 may include data for both depth image and a two-dimensional image. The sensors 140 may be, for example, a combination of depth sensor and camera manufactured by Canesta of Sunnyvale, Calif., CSEM of Zurich, Switzerland, and 3DV Systems of Yokneam, Israel.

The effectors 290 are coupled to the processing module 200 to receive command signals 282 to cause certain actions by the robot 130. The effectors 290 may be various devices causing real-world events including, among others, motors and actuators. The command signals 282 may cause multiple effectors 290 of the robot 130 (e.g., joints) to move in a coordinated manner to perform some meaningful tasks such as walking or pushing of an object.

The processing module 200 includes, among other components, a flat surface detector 240, an object detector 250, an environment mapper 260, a motion planner 270, and a controller 280. Each of these components, in conjunction with other components, may be implemented, for example, in software, hardware, firmware or any other combination thereof. The processing module 200 may be implemented as a general purpose computer or dedicated computing devices. The processing module 200 may also be distributed throughout the robot 130. For example, multiple controllers 280 for different effectors may be provided at different parts of the robot 130.

The flat surface detector 240 detects an object having a flat surface by using the image data 210. By using both the color image and depth image in the image data 210, the flat surface detector 240 may locate the flat surface more robustly and efficiently. The depth image processing module 242 determines a general area where the flat surface is likely to be located, as described below in detail with reference to FIG. 3A. The color image processing module 244 then detects the edge features of the flat surface within the general area, as described below in detail with reference to FIG. 3B. The flat surface detector 240 then provides flat surface information 248 to the environment mapper 260. The flat surface information 248 includes the localization information of a flat surface. In one or more embodiments, the localization information indicates a two-dimensional coordinate or three dimensional coordinate and orientation of the object having the flat surface.

The object detector 250 detects various objects inside or outside the flat surface. In one embodiment, the object detector 250 detects various features of objects in the color image and provides object information 252 to the environment mapper 260. The object information 252 includes, for example, localization information and object profile indicating the identity and characteristics of the object.

The environment mapper 260 maintains and tracks information about objects in the surroundings of the robot 130. Specifically, the environment mapper 260 receives the object information 252 and flat surface information 248 and then maps the objects to two-dimensional or three-dimensional coordinates. The environment mapper 260 may store information regarding profiles (e.g., width, height, and length of objects) and locations of the object as detected by the robot 130. In one embodiment, the environment mapper 260 also stores location and profile information of objects that is provided by a user or sources other than the flat surface detector 240 and the object detector 250. The environment mapper 260 provides environment information 262 to the motion planner 270. The environment information 262 includes the information concerning location and profiles of the objects in the surroundings of the robot 130.

The motion planner 270 generates plans for motions to be taken by the robot 130. Specifically, the motion planner 270 receives the environment information 262 and produces plans (e.g., walk to a point via a certain path) for one or more motions to be executed by the robot 130. The planned motions may be associated with tasks the robot 130 is programmed to perform. Based on the plans, the motion planner 270 sends commands 272 (e.g., bend leg joint by 30 degrees) to the controller 280. The controller 280 then sends control signals 282 to various effectors 290 to perform motions by the effectors 290.

Architecture of Depth Image Processing Module

Figure 3A:
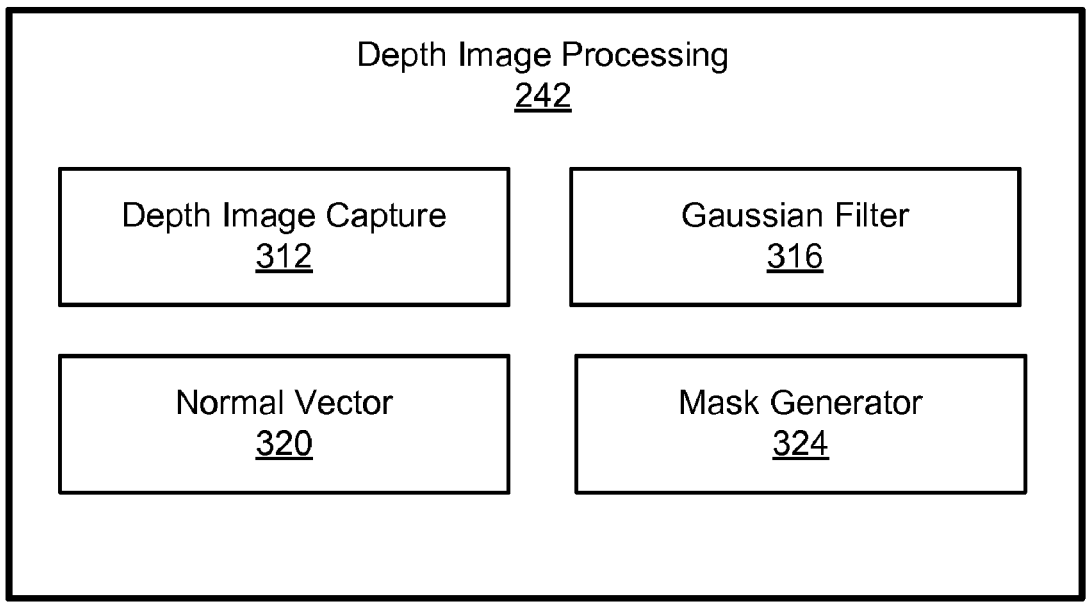
FIG. 3A is a block diagram of a depth image processing module, according to one embodiment of the present invention.

FIG. 3A is a block diagram illustrating the depth image processing module 242, according to one embodiment. The depth image processing module 242 includes, among other modules, a depth image capture module 312, a Gaussian filter 316, a normal vector module 320, and a mask generator 324. Each of these components, in conjunction with other components, may be implemented, for example, in software, hardware, firmware or any other combination thereof.

The depth image capture module 312 captures and buffers the depth image included in the image data 210. The depth image capture module 312 temporarily stores the depth image captured at a certain time to allow the Gaussian filter 316 or other modules of the depth image processing module 242 to access and retrieve the depth image.

Figure 5A:
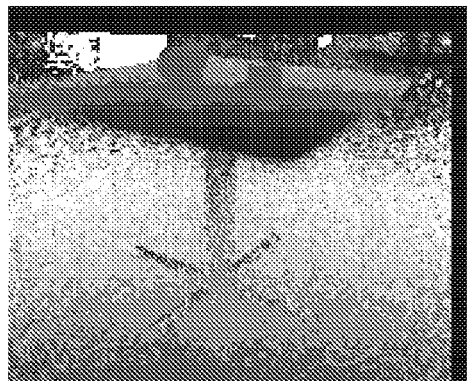
FIGS. 5A-5D are diagrams illustrating processing of a depth image to obtain a mask for cropping a corresponding color image, according to one embodiment of the present invention.
Figure 5B:
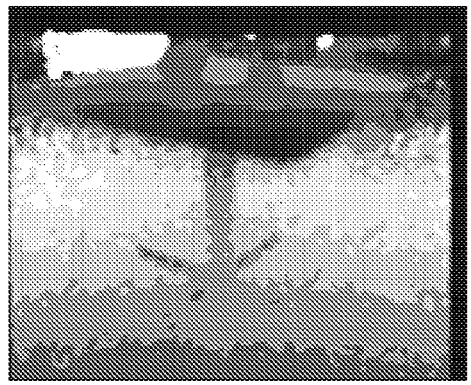

The Gaussian filter 316 is used for processing the depth image to reduce noises. As illustrated in FIG. 5A, depth images obtained from the depth sensor are generally very noisy. By processing the depth image by the Gaussian filter 316, the noise in the depth image is reduced, as illustrated in FIG. 5B. The depth image with reduced noise allows the subsequent processing of the depth image to be performed more robustly and accurately. Other types of filters such as Gaussian, median and mean filters may also be used to reduce noises in the depth image. The processing by the Gaussian filter 316 may be omitted if the noises in the depth images are not significant.

Figure 5C:
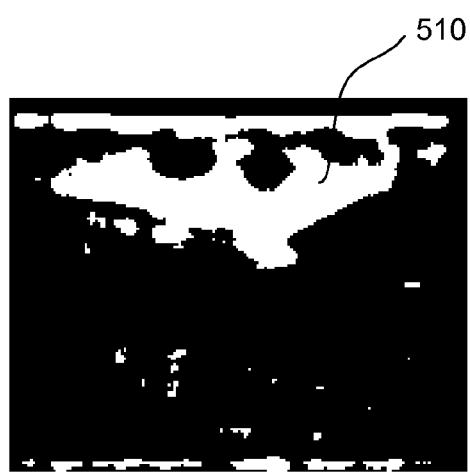

The normal vector module 320 detects an area of the depth image where the normal vectors are generally in a predetermined direction. In one embodiment, the predetermined direction of the normal vector is selected automatically by the flat surface detector 240 or by manual selection by the user. For example, if a top surface of an object (e.g., table) is being targeted for detection, the predetermined direction of the normal vector is vertically upward in the physical world (this direction may be slanted in the depth image because the depth image is in a perspective projection). If a vertically flat surface (e.g., a whiteboard) is being targeted for detection, the predetermined direction of the normal vector is substantially horizontal (the normal vector may also be slanted from the horizontal direction in the depth image because the depth image is in a perspective image). After the predetermined direction is identified, the normal vector module 320 scans the depth image for the pixels having their normal vectors indicating a direction within a predefined tolerance range from the predetermined direction. The method for obtaining the normal vectors from the depth image is well known in the art. For example, the normal vectors may be obtained by fitting a smooth surface to the depth information and then calculating the normal of the surface. FIG. 5C is a diagram illustrating areas 510 of the depth image having normal vectors indicating a generally upward direction. The depth image of FIG. 5C also includes small patches of white clusters of pixels that may be the result of noises in the depth image or surfaces of other smaller objects having a flat surface.

Figure 5D:
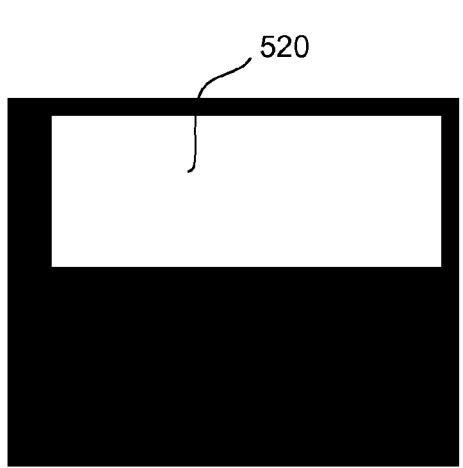

The mask generator 324 functions to generate a mask representing a candidate area where the flat surface of the object is likely to be present. Specifically, the mask generator 324 receives information about the areas of the depth image having normal vectors pointing to a direction that is within a tolerance range from the predetermined direction (e.g., vertically upward). In one embodiment, the mask generator 324 determines the candidate area by selecting a contiguous area that has normal vectors within a range from the predetermined direction. FIG. 5D illustrates a mask 520 generated by expanding the contiguous area vertically and horizontally into a rectangular shape. The rectangular shape is merely an example, and various other shapes such as a circle or a rhombus may be used. After the mask is generated, the mask is provided to the color image processing module 244 for further processing.

Architecture of Color Image Processing Module

Figure 3B:
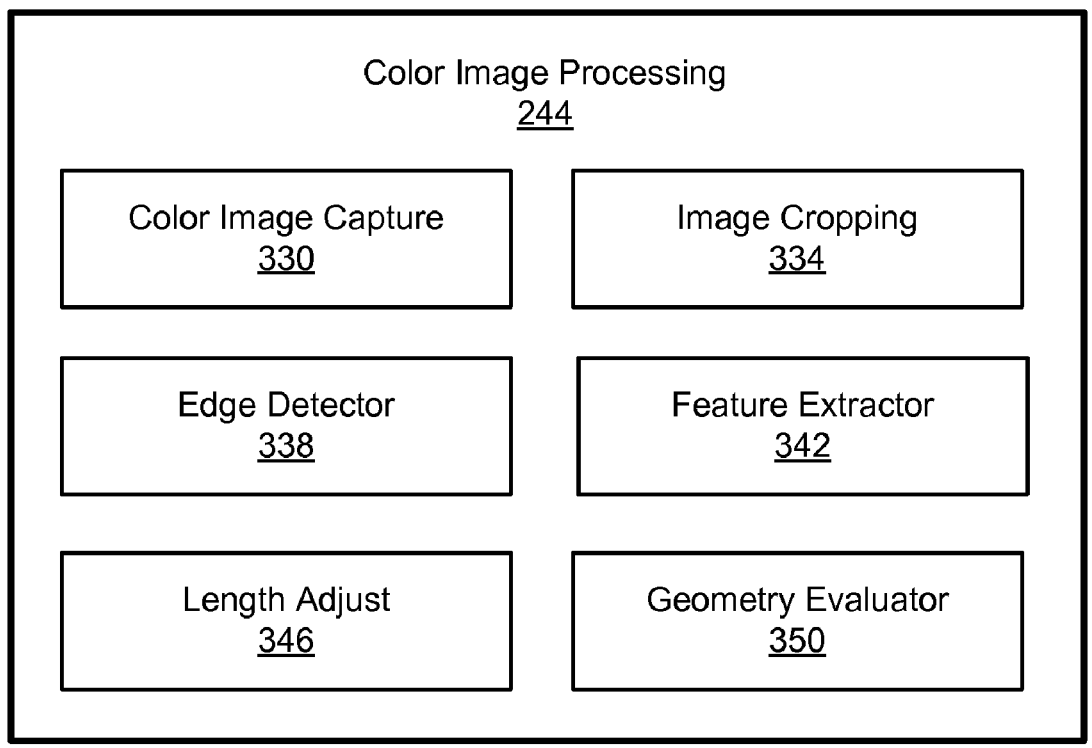
FIG. 3B is a block diagram of a color image processing module, according to one embodiment of the present invention.

FIG. 3B is a block diagram illustrating the color image processing module 244, according to one embodiment of the present invention. The color image processing module 244 includes, among other modules, a color image capture module 330, an image cropping module 334, an edge detector 338, a feature extractor 342, a length adjust module 346, and a geometry evaluator 350. Each of these components, in conjunction with other components, may be implemented, for example, in software, hardware, firmware or any other combination thereof.

Figure 6A:
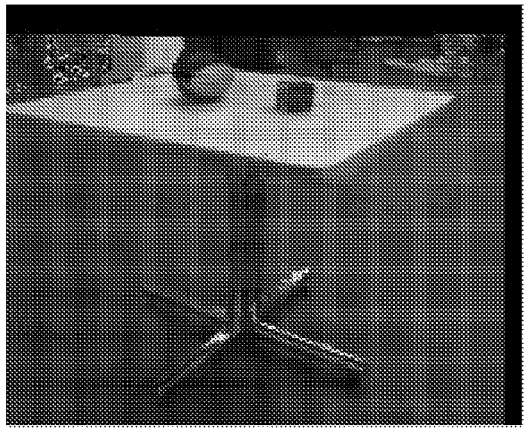
FIGS. 6A-6G are diagrams illustrating processing of a color image to determine outlines of the flat surface of the table, according to one embodiment of the present invention.

The color image capture module 330 captures and buffers the color image included in the image data 210. The color image capture module 330 temporarily stores the color image captured at a certain time to allow the image cropping module 334 or other modules of the color image processing module 244 to access and retrieve the depth image. FIG. 6A is a diagram illustrating a color image captured and stored in the color image capture module 330.

Figure 6B:
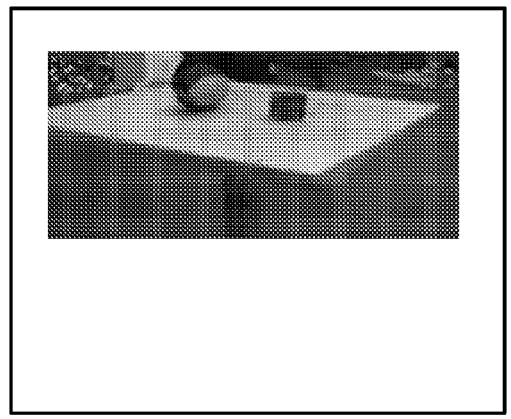

The image cropping module 334 retrieves the color image capture module 330 and crops the color image according to the mask provided by the depth image processing module 242. In one embodiment, the location and size of the mask as generated by depth image processing module 242 are calibrated before cropping the color image by the image cropping module 334. FIG. 6B is a diagram illustrating the color image of FIG. 6B cropped using the mask 520 illustrated in FIG. 5D. By cropping the color image, the flat surface is detected only on a candidate area of the color image where the flat surface is likely to be present. Because portions of the color image unlikely to include the flat surface are excluded from further processing, the flat surface can be detected from the color image more efficiently and robustly.

Figure 6C:
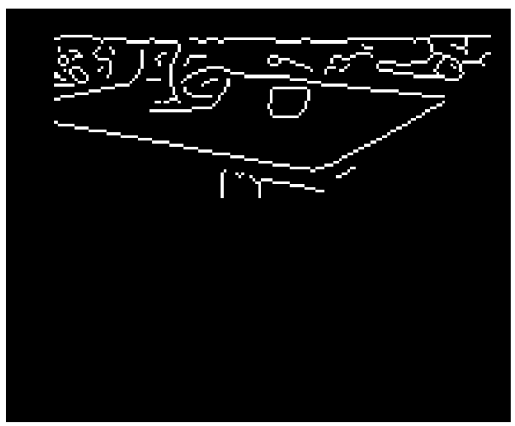

The edge detector 338 performs edge detection on the cropped color image by detecting sharp changes in color. In one embodiment, the edge detector 338 is a canny edge detector. Preprocessing such as image thresholding may be performed before detecting the edges in the cropped color image to enhance edge detection. In one embodiment, the edge detector 338 provides parameters obtained during the edge detection to the feature extractor 342 to enhance the geometric feature detection. FIG. 6C is a diagram illustrating the result of edge detection on the cropped color image of FIG. 6B by the edge detector 338.

Figure 6D:
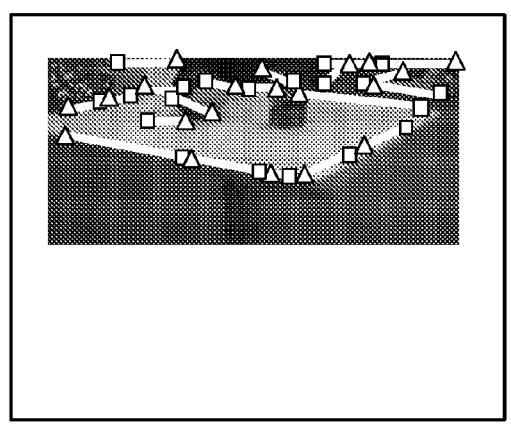

The feature extractor 342 detects the geometric features from the edge detected color image. Specifically, the feature extractor 342 detects geometric features such as lines, curves, and circles from edge detected image. The geometric features to be detected may depend on the shape of the flat surface to be detected. To detect flat surfaces outlined by straight lines (for example, the edges of the rectangular table as illustrated in FIGS. 6A-6G), line features may be detected. To detect flat surfaces having other shapes (e.g., ellipse or circle), a generalized Hough transform adapted for arbitrary shapes may be used as described, for example, in D. H. Ballard, "Generalizing the Hough Transform to Detect Arbitrary Shapes," Pattern Recognition, vol. 13, no. 2, pp. 111-122 (1981), which is incorporated by reference herein in its entirety. In one embodiment, the feature extractor 342 performs the Hough transform to detect line features from the edge detected color image. FIG. 6D is a diagram illustrating the line features detected by the feature extractor 342. In FIG. 6D, a triangle represents one end of a line feature and a square represents the other end of the same line feature. In one embodiment, the feature extractor 342 receives values for parameters from the edge detector such as the coordinates of pixels representing the edges. Such parameters allow more accurate detection of the line features at the feature extractor 342.

As illustrated in FIG. 6D, line features other than the outlines of the flat surfaces may also detected. In order to improve the accuracy of the flat surface localization, the line features not representing the outlines of the flat surfaces should be removed as much as possible while preserving the line features representing the outlines of the flat surfaces. In one embodiment, the color image processing module 244 filters the line features by excluding the line features that show significant variation in depths at corresponding sample points in the depth image. If the change of depth for the sample points in the line points exceed a threshold, this line feature is more likely to be a result of different objects having their edges aligned by coincidence or due to noises in the color image. That is, the line features where their points show abrupt changes in depth are less likely to be edges of the flat surface.

Figure 6E:
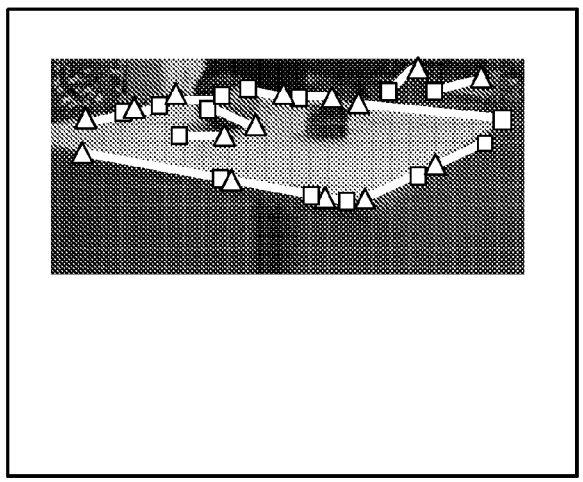

The color image processing module 242 may receive the depth information from the depth image processing module 244, and exclude the line features where their sample points do not show consistent or gradually change of depth. FIG. 6E is a diagram illustrating the line features remaining after filtering out the line features where its sample points in the depth image have abruptly changes in depths. After filtering such line features, most of the line features remaining represent either the outlines of the flat surface or objects on the flat surface.

The length adjust module 346 approximates the physical lengths of the geometric features. The geometric features further away from the sensors 140 may appear in the color image as having shorter lengths compared to the geometric features closer to the sensors 140. Therefore, the length adjust module 346 receives the depth information associated with the geometric features from the depth image processing module 242 and calculates the approximate physical lengths of the line features in the color image for comparison by the geometry evaluator 350.

The geometry evaluator 350 functions to select the geometric features that are likely to be outlines of the flat surface. One or more criteria may be used to select the geometric features. Such criteria include the approximate physical lengths of the line features. The flat surfaces such as table are likely to have edges with physical lengths that are longer than other objects placed on the table. Therefore, the geometry evaluator 350 may rank and select the line features that have the longest lengths. After enough line features are selected to form outlines of the flat surface, the geometry evaluator 350 extracts a candidate flat surface for evaluation.

After the candidate flat surface is determined, the candidate flat surface is evaluated using one or more criteria. The criteria may include, among others, the ratio of the line features consistent with the flat surface exceed a predetermined threshold, whether vectors normal to the pixels in the flat surfaces are substantially aligned, and whether the size of the flat surface is within the predetermined range (i.e., not too small or too big). If the candidate flat surface satisfies the criteria, the candidate flat surface is finalized as the flat surface. On the other hand, if the candidate flat surface does not meet the criteria, different combinations of line features may be selected for evaluation. In one embodiment, the line features in the next combination have shorter lengths compared to the line features in the previous combination. If none of the flat surfaces generated from subsequent combinations of line features meet the criteria, then it is declared that no flat surface was found in the image.

Figure 7:
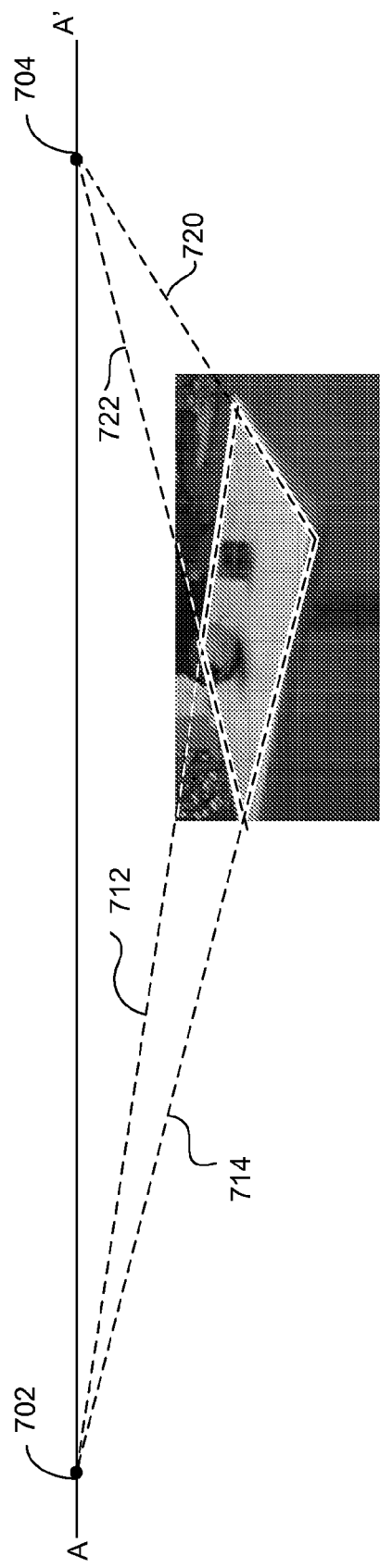
FIG. 7 is a schematic diagram illustrating a method of determining vanishing lines in the color image, according to one embodiment of the present invention.

After the final flat surface is determined, the orientation of the object having this flat surface is determined. FIG. 7 illustrates an example of determining the orientation of a rectangular object having a flat surface by using a vanishing line. Under the perspective projection as illustrate in FIG. 7, each of the two pairs of parallel edges in the rectangular object intersect at points A 702, and A' 704. Such points where the parallel edges intersect are known as vanishing points. By connecting the two vanishing points 702, 704, a vanishing line A-A' is obtained that is parallel to the ground plane of the image.

Based on the vanishing line and the intrinsic camera calibration matrix, the normal vector orthogonal to the flat surface may be obtained. The intrinsic camera calibration matrix, in conjunction with the vanishing line, may then be used to obtain two vectors parallel to the sides of the flat surface. The normal vector and the two directional vectors form a reference frame that defines the orientation of the object having the flat surface in the three-dimensional space. If the dimension of the flat surface is known and provided to the flat surface detector 240, the three dimensional coordinate and the orientation of the object having the flat surface may be determined.

Computing the vanishing line A-A', the intrinsic camera calibration matrix and the orientation of the flat surface is described, for example, in Richard Hartley and Andrew Zisserman, "Multiple view geometry in computer vision," First Edition, Cambridge University Press, pp. 205-213 (2003), which is incorporated by reference herein its entirety.

Figure 6F:
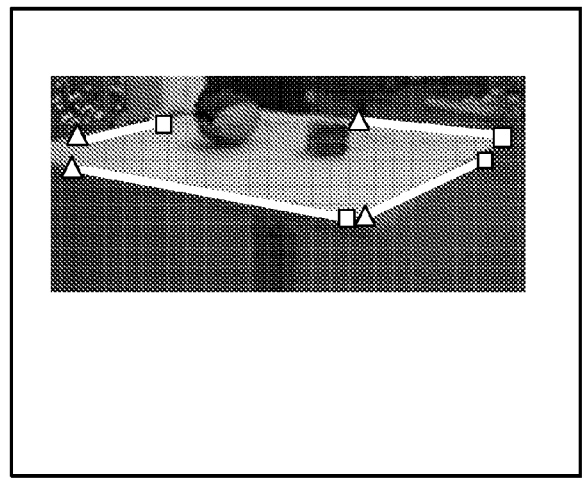
Figure 6G:
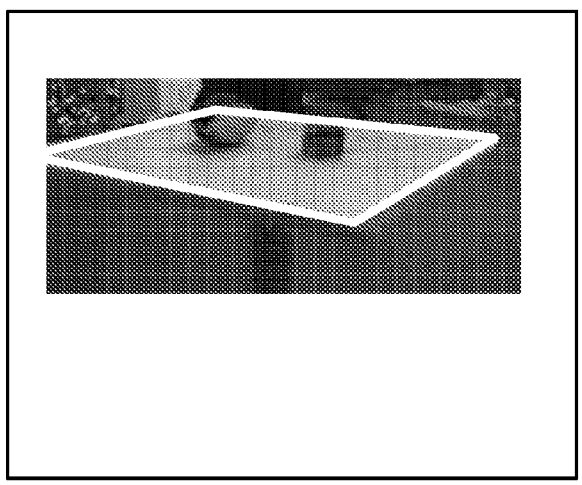

FIG. 6F illustrates the line features selected after ranking the line features and determining the geometric relationship between the line features. The selected line features are then extended to obtain the line features outlining the flat surface as illustrated in FIG. 6G. After the geometry evaluator 350 determines the flat surfaces, the color image processing module 244 outputs the flat surface information 248 to the environment mapper 260 including the localization information of the flat surface.

Method of Detecting Flat Surfaces

Figure 4A:
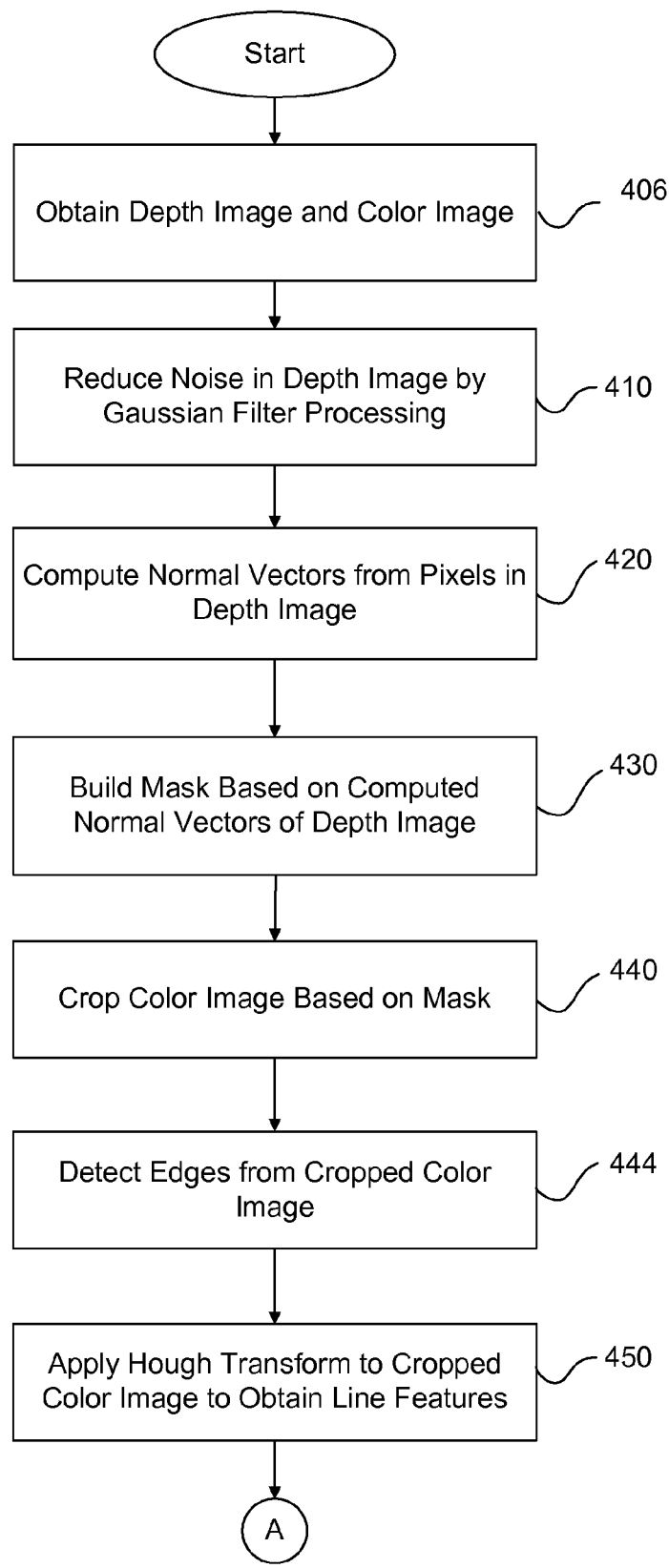
FIGS. 4A and 4B are flowcharts illustrating a method for detecting a flat surface, according to one embodiment of the present invention.
Figure 4B:
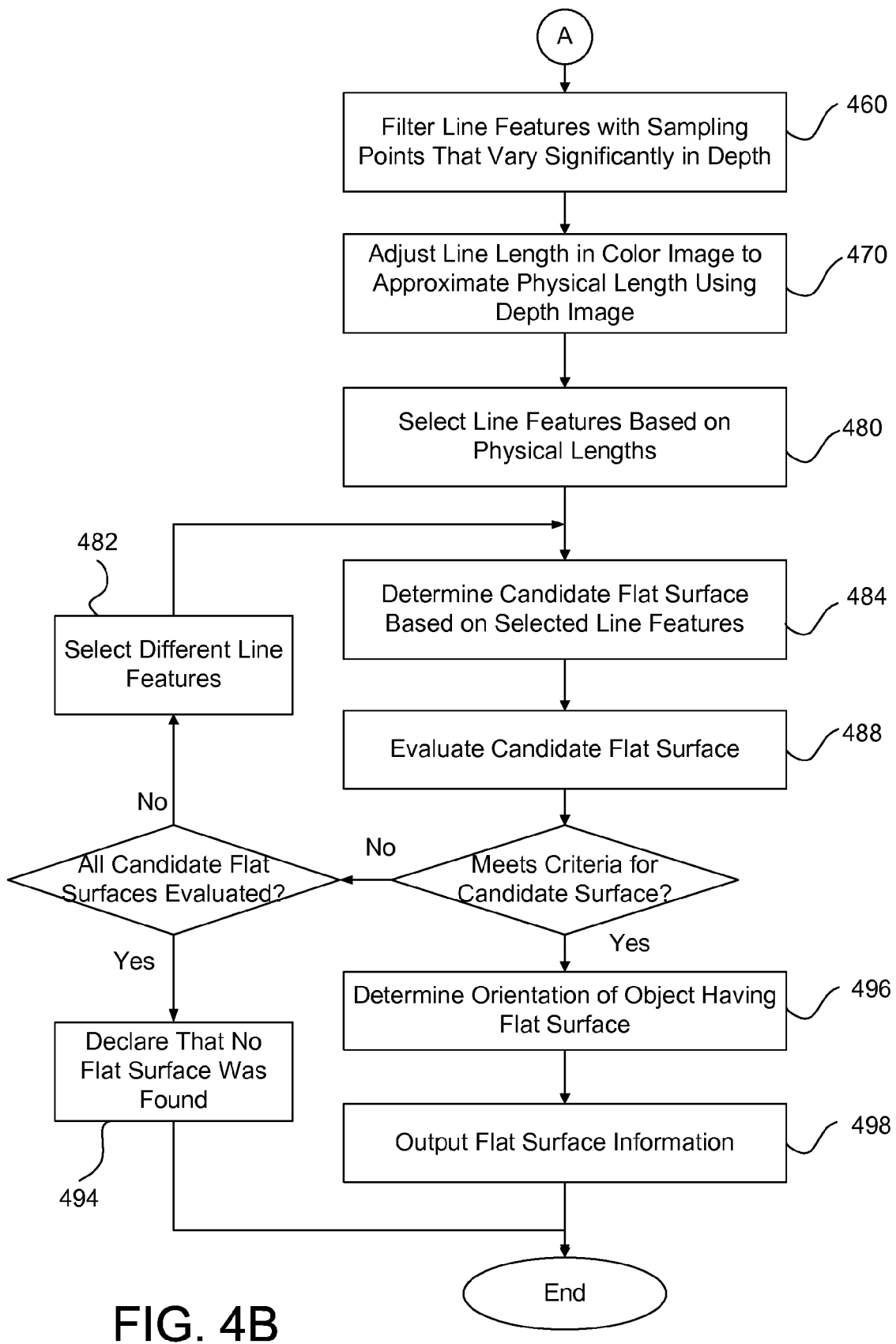

FIGS. 4A and 4B illustrate flow charts of a method for detecting a flat surface, according to one embodiment of the present invention. First, the depth image and the color image are obtained 406 from the stream of image data 210 by the depth image capture module 312 and the color image capture module 330, respectively. The depth image is then smoothed by processing it with a Gaussian filter 316 to reduce 410 noises in the depth image. Depending on the quality of the depth image, this step 410 need not be performed and may be omitted.

The normal vectors in the depth images are computed 420 from the pixels in the depth images by the normal vector module 320. Then the mask for cropping the color image is built 430 based on the normal vectors of the depth image by the mask generator 324. Specifically, a group of pixels in the depth image having normal vectors within a tolerance range from a predetermined direction are selected. Then areas including the group of pixels are expanded to obtain the mask of certain geometric shapes (e.g., rectangle) by the mask generator 324. The image cropping module 334 then crops 440 the color image using the mask.

The edges are detected 444 from the cropped color image by the edge detector 338. Then the Hough transform is applied 450 to the edges detected from the color image by the feature extractor 342 to obtain line features that are candidates for edges of flat surfaces. Other processing methods or transform may be applied (e.g., circular Hough transform) to detect other types of geometric features (e.g., curve).

The candidate lines having sampling points of abruptly changing depths are then filtered out 460. Specifically, two or more points are sampled at points in the depth image corresponding to the line features. If the differences in the depths of the sampling points exceed a threshold, the line features are eliminated from the pool of candidate line features that may be edges outlining the flat surface.

The lengths of the candidate line features are then adjusted 470 by the length adjust module 346 to approximate the physical length of the lines in real world. Then the lines features are selected 480 based on the length of the line features. Specifically, a subset of line features having longer lengths are selected from the geometric features as defining a candidate flat surface.

The candidate flat surface is then evaluated 488 based on one or more criteria such as the size of the flat surface, the ratio of line features supporting the edges of the flat surface, and the percentage of pixels with in the edges having normal vectors within predetermined tolerances.

If the candidate flat surface meets the criteria, the candidate is determined as a final flat surface for which the orientation of the object is determined 496. Specifically, the vanishing line, the intrinsic camera calibration matrix and the direction vectors parallel to the lines representing the sides of the flat surface are computed to determine the two-dimensional or three-dimensional coordinate and the orientation of the object having the flat surface. The flat surface information including the coordinate and the orientation of the object is then output 498 from the color image processing module 244.

If the candidate flat surface does not meet the criteria, the candidate flat surface is discarded and different line features are selected 482. The process returns to step 484 where another candidate flat surface is determined based on the selected line features. In one embodiment, the line features of shorter lengths are combined to generate a next candidate flat surface.

If none of the candidate flat surfaces from subsequent combinations of the line features meet the criteria, then it is declared 494 that no flat surface was found in the image.

Alternative Embodiments

The flat surface information 248 generated by the flat surface detector 240 may be used for other purposes. In one embodiment, the flat surface information 248 is used for calibrating camera. Specifically, the flat surface information 248 is used for obtaining the camera pose that represents the relative orientation and position of the objects in images (captured by the camera) relative to the camera.

In one embodiment, the flat surface information generated by previous frames of color image and depth image is stored in the flat surface detector 240 so that consistency detection of flat surface may be performed across multiple frames of sequential images. That is, if the flat surfaces were not detected in the previous frames of image data 210, the flat surface detector 240 is biased toward not detecting the flat surface in the next frames of images. In contrast, if the flat surfaces were detected in the previous frames, the flat surface detector 240 is biased toward detecting the flat surface in the next frames of image. Further, the stored flat surface information of a previous frame may be referenced to determine the portion of the image in a subsequent frame where the search for the flat surface should start.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method of localizing an object having a flat surface, comprising:

receiving a depth image comprising image pixels representing distances between a depth sensor and parts of objects in the depth image;

determining a candidate area in the depth image by processing the depth image, wherein the candidate area is a contiguous area having a size smaller than the depth image and represents a portion of the depth image that likely includes the flat surface;

receiving a color image captured by a camera, the color image covering the candidate area in the depth image; and detecting the flat surface of the object in the candidate area of the color image by detecting and selecting geometric features from the color image that outlines boundaries of the flat surface.

2. The method of claim 1, wherein determining the candidate area in the depth image comprises:

computing normal vectors from the image pixels of the depth image, the normal vectors representing vectors perpendicular to a surface of an object in the depth image;

determining one or more areas of the depth image having normal vectors in a predetermined direction; and expanding the one or more areas of the depth image to generate a mask representing the candidate area, a portion of the color image corresponding to the mask cropped to detect the geometric features.

3. The method of claim 1, further comprising Gaussian filtering the depth image before determining the candidate area.

4. The method of claim 1, wherein detecting the geometric features comprises:

detecting edges in the color image covering the candidate area; and performing Hough transform on the detected edges to obtain line features in the color image.

5. The method of claim 1, wherein selecting the geometric features comprises:

adjusting lengths of the detected geometric features according to depth information in the depth image to determine physical lengths of the geometric features; and selecting a subset of the detected geometric features as outlining a candidate flat surface based on the physical lengths of the detected geometric features.

6. The method of claim 5, wherein the candidate flat surface is evaluated based at least on one of a group consisting of a size of the candidate flat surface, similarity of vectors normal to pixels in the candidate flat surface, and a ratio of the geometric features supporting the candidate flat surface.

7. The method of claim 5, selecting the geometric features further comprises excluding the detected geometric features responsive to determining that a change of depth in points of the geometric feature exceed a threshold.

8. A non-transitory computer readable storage medium structured to store instructions for detecting an object having a flat surface, the instructions when executed by a processor cause the processor to:

receive a depth image comprising image pixels representing distances between a depth sensor and parts of objects in the depth image;

determine a candidate area in the depth image by processing the depth image, wherein the candidate area is a contiguous area having a size smaller than the depth image and represents a portion of the depth image that likely includes the flat surface;

receive a color image captured by a camera, the color image covering the candidate area in the depth image; and detect the flat surface of the object in the candidate area of the color image by detecting and selecting geometric features from the color image that outlines boundaries of the flat surface.

9. The computer readable storage medium of claim 8, wherein instructions to determine the candidate area in the depth image comprise instructions to:

compute normal vectors from the image pixels of the depth image, the normal vectors representing vectors perpendicular to a surface of an object in the depth image;

determine one or more areas of the depth image having normal vectors in a direction; and expand the one or more areas of the depth image to generate a mask representing the candidate area, the color image cropped to select portions of the color image corresponding to the mask, a portion of the color image corresponding to the mask cropped to detect the geometric features.

10. The computer readable storage medium of claim 8, further comprising instructions to Gaussian filter the depth image before executing instructions to determine the candidate area.

11. The computer readable storage medium of claim 8, wherein instructions to detect the geometric features comprise instructions to:

detect edges in the color image covering the candidate area; and perform Hough transform on the detected edges to obtain line features in the color image.

12. The computer readable storage medium of claim 8, wherein instructions to select the geometric features comprise instructions to:

adjust lengths of the detected geometric features according to depth information in the depth image to determine physical lengths of the geometric features; and select a subset of the detected geometric features as the outlining a candidate flat surface based on the physical lengths of the detected geometric features.

13. The computer readable storage medium of claim 12, wherein the candidate flat surface is evaluated based at least on one of a group consisting of a size of the candidate flat surface, similarity of vectors normal to pixels in the candidate flat surface, and a ratio of the geometric features supporting the candidate flat surface.

14. The computer readable storage medium of claim 13, wherein instructions to select the geometric features further comprise instructions excluding the detected geometric features responsive to determining that a change of depth in points of the geometric feature exceed a threshold.

15. A system for localizing an object having a flat surface, comprising:

a depth image processing module configured to receive a depth image comprising image pixels representing distances between a depth sensor and parts of objects in the depth image, the depth image processing module determining a candidate area in the depth image by processing the depth image, wherein the candidate area is a contiguous area having a size smaller than the depth image and represents a portion of the depth image that likely includes the flat surface; and a color image processing module operatively coupled to the depth image processing module, the color image processing module configured to receive a color image captured by a camera, the color image covering the candidate area in the depth image, the color image processing module configured to detect the flat surface of the object in the candidate area of the color image by detecting geometric features from the color image and selecting geometric features that outlines boundaries of the flat surface.

16. The system of claim 15, wherein the depth image processing module comprises:

a normal vector module configured to compute normal vectors from the image pixels of the depth image, the normal vectors representing vectors perpendicular to a surface of an object in the depth image, and determine one or more areas of the depth image having normal vectors in a predetermined direction; and a mask generator coupled to the normal vector module, the mask generator configured to expand the one or more areas of the depth image to generate a mask representing the candidate area, a portion of the color image corresponding to the mask cropped to detect the geometric features.

17. The system of claim 15, comprising a filter module configured to Gaussian filter the depth image before determining the candidate area.

18. The system of claim 15, wherein the color image processing module comprises:

an edge detector module configured to detect the geometric features by detecting edges in the color image covering the candidate area; and a feature extractor module coupled to the edge detector module, the feature extractor module configured to perform Hough transform on the detected edges to obtain line features in the color image.

19. The system of claim 15, wherein the color image processing module further comprises:

a length adjust module configured to adjust lengths of the detected geometric features according to depth information in the depth image to obtain physical lengths of the geometric features; and a geometry evaluator module coupled to the length adjust module, the geometry evaluator module configured to select a subset of the detected geometric features as outlining a candidate flat surface based on the physical lengths of the detected geometric features.

20. The system of claim 19, wherein the geometry evaluator module determines a vanishing line, an intrinsic camera calibration matrix, a vector normal to the flat surface, and vectors parallel to edges of the flat surface to determine location and orientation of the flat surface.

* * * * *